April 16, 1929.  W. A. FOSS  1,709,010
ARTIFICIAL LURE FOR FISH
Filed Aug. 4, 1926

Inventor
William A. Foss
By Fred Gerlach
his Atty.

Patented Apr. 16, 1929.

1,709,010

UNITED STATES PATENT OFFICE.

WILLIAM A. FOSS, OF CLEVELAND, OHIO.

ARTIFICIAL LURE FOR FISH.

Application filed August 4, 1926. Serial No. 126,956.

The invention relates to artificial lures for fish.

In the type of lure known in the art as "pork rind" bait, as now extensively used, a flexible strip of pork rind is attached to the body of the lure and extended beyond the hook to form a wiggly tail-piece.

The object of the present invention is to provide a lure which is adapted to provide a plurality of flexible or wiggly strips and one which may be readily changed to present different appearances to the fish.

Other objects of the invention will appear from the detailed description.

The invention consists in the several novel features hereinafter set forth and more particularly defined by the claims at the conclusion hereof.

Figure 1:
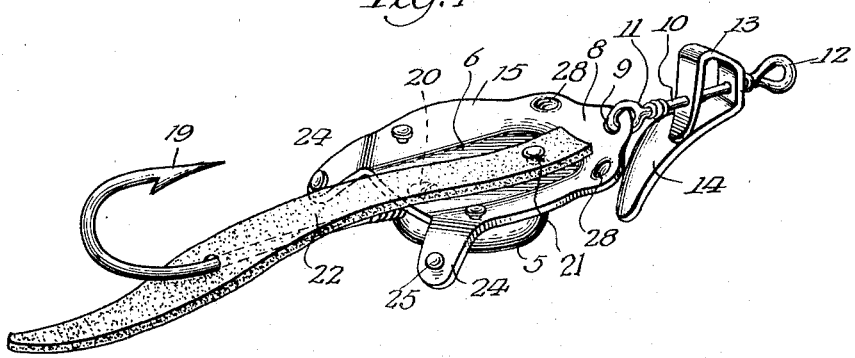
Figure 2:
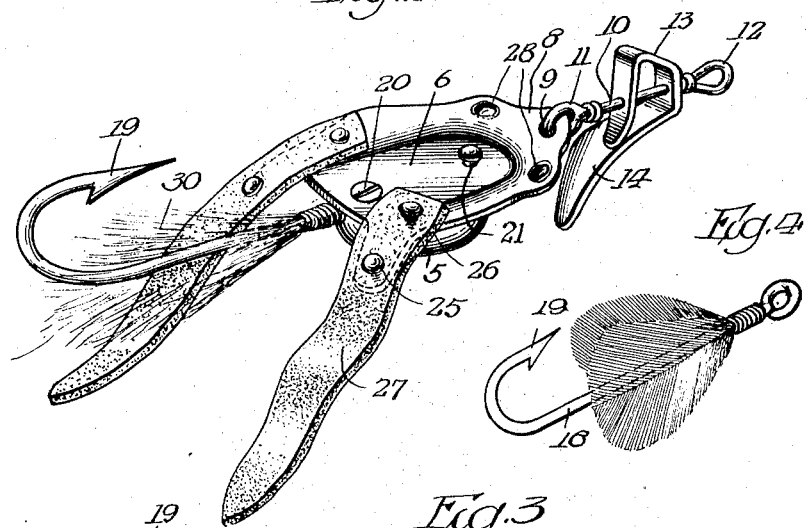
Figures 3, 4:
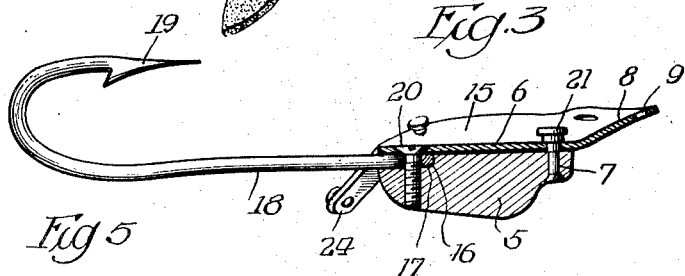
Figure 5:
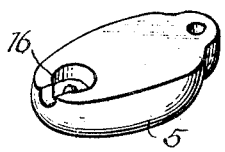

In the drawing: Fig. 1 is a perspective of a lure embodying the invention with a single longitudinally extending flexible strip attached thereto. Fig. 2 is a view of the lure with a plurality of flexible strips at the sides of the body lure to simulate, when vibrated in the water, the leg action of live bait. Fig. 3 is a longitudinal section. Fig. 4 is a perspective of a feathered hook which may be substituted for the plain hook illustrated in Figs. 1 and 3 or the hook with a buck-tail illustrated in Fig. 2. Fig. 5 is a perspective of the weight.

The invention is exemplified in a lure which comprises a body consisting of a member or weight 5 and a plate 6. The member 5 is formed of metal to serve as a weight for the lure and the bottom portion thereof is rounded. The plate 6 is attached and pivotally connected to the member 5 by a suitably shouldered stud 7, which permits the plate and weight to be swung relatively to each other. The front end of the plate 6 is inclined upwardly, as at 8, and provided with a hole 9. A rod 10 has its rear end provided with an eye 11 which extends through the hole 9 and its front end with an eye 12 for connection to a line or leader, as well understood in the art. A spinner 13 is rotatably confined on rod 10 and is preferably formed of a single strip of metal and with a single curved blade 14 which is shaped to cause it to spin as the lure is drawn through the water, so that the body of the lure and parts attached thereto will be vibrated to cause the flexible parts attached thereto to wiggle and simulate action or life. The side portions of plate 6 are flared upwardly and outwardly, as at 15. A recess 16 is formed in the upper face and at the rear end of the body 5, and conforms to, and is adapted to receive, the usual eye 17 on the front end of a shank 18 of a fish hook provided with a forwardly extending barb or point 19. A screw 20 has a head adapted to engage the plate 6 and a shank which is adapted to extend through the eye 17 of the hook and is threaded into the member 5. This screw may be readily withdrawn and replaced to permit any one of a number of different kinds of hooks to be connected to, and removed from, the body. The pivoted stud 7 has its upper end formed with a button 21 which is adapted to secure the front end of a flexible strip 22 of pork rind or the like on the top and flatwise on the plate, while the middle portion of th strip is impaled on the shank of the hook and its rear end forms a freely flexible tail piece as illustrated in Fig. 1.

Tongues 24 are integrally formed with the plate 6 and extend outwardly and rearwardly from the side portions 15 of said plate. A pair of buttons or headed studs 25 and 26 are provided at each side of the plate to secure the front end of a flexible strip 27 of pork rind or the like to the body. Each stud 25 is disposed adjacent the outer and rear end of a tongue 24, and each stud 26 is disposed adjacent the rear end of one of the side portions 15. As a result, the front end of the strips 27 will be rigidly attached to the plate and their rear trailing portions will be freely flexible and will diverge rearwardly to simulate the appearance of the legs of a frog or other animal. The vibration, to which the body is subjected by the spinner, will cause the trailing portions of the strips 27 to wiggle and be lifelike and thus cause them to present an animated appearance while the lure is being dragged or drawn through the water. In outline, the plate 6 simulates the outline of a frog, and indentations 28 near the front of the plate are provided to simulate the eye of a frog.

The invention exemplifies a lure which is adapted to be readily changed, so as to present different appearances and actions to the fish. The fish hook is readily removable from the body when the screw 20 is withdrawn. The lure may be used with a single strip of pork rind 22 and with a plain fish hook as illustrated in Fig. 1, or with leg-like strips 27 and either a plain hook or with a hook provided with a buck-tail 30, as shown in Fig. 2, or with the tail strip 22 and a plain hook and the leg strips 27 so as to provide both a wiggly tail-piece and legs, or the body may be used without any of the strips and with either a plain buck-tail or feathered hook. All of these changes may be made without disconnecting the lure from the line.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an artificial lure, the combination of a body, a hook secured to the body, and a pair of devices for removably attaching to the body the front ends of a pair of separately formed flexible strips, said devices being spaced apart so as to hold the strips in spaced relation to simulate legs.

2. In an artificial lure, the combination of a body, a hook secured to the body, and a pair of devices for removably attaching to said body the front ends of a pair of separately formed flexible strips, said devices being positioned on opposite sides of the hook and being spaced apart a sufficient distance to hold the strips in spaced relation to simulate legs.

3. In an artifical lure, the combination of a body, a hook secured to the body, means for attaching to the body the front ends of a pair of separately formed flexible strips so they extend downwardly and outwardly from the body said means being positioned so as to hold the front ends of the strips in spaced relation, and means to cause said strips to wiggle.

4. In an artificial lure, the combination of a body, a hook secured to the body, means for attaching a flexible tail-piece centrally on the body, and means for attaching to the body on opposite sides of the hook the front ends of a pair of separately formed flexible strips to simulate legs.

5. In an artificial lure, the combination of a body comprising a plate and a member secured thereto, a fish-hook secured to the body, means for attaching to the plate on opposite sides of the hook a plurality of separately formed flexible leg-like strips, and means for causing the strips to wiggle.

6. In an artificial lure, the combination of a body comprising a plate and a member secured thereto, a fish-hook secured to the body, means on the plate for attachment to its sides, of a plurality of flexible leg-like strips, means on the central portion of the plate for attachment of a flexible tail strip, and means for causing the strips to wiggle.

7. In an artificial lure, the combination of a plate and a body-member pivoted thereto, a fish-hook removably clamped between the plate and the member, and means on the plate for attachment to its sides of a plurality of flexible leg-like strips, and means for causing the strips to wiggle.

8. In an artificial lure, the combination of a plate and a body-member pivoted thereto, a fish-hook removably clamped between the plate and the member, means on the plate for attachment to its sides of a plurality of flexible leg-like strips, and means on the plate for attachment of a central flexible tail strip.

9. In an artificial lure, the combination of a body comprising a plate with an upturned marginal portion at its front sides and resembling the outline of a frog with tongues at its rear, a hook secured to the body, and means for removably attaching flexible leg strips to the plate and over the tongues.

10. In an artificial lure, the combination of a body comprising a weight and a plate with an upturned marginal portion at its front sides and resembling the outline of a frog, means for removably securing a hook to the body, and means for removably attaching the front ends of flexible leg strips to diverge rearwardly of and from the plate.

11. In an artificial lure, the combination of a body comprising a weight and a plate with an upturned marginal portion at its front sides and generally resembling the outline of a frog, means for removably clamping a hook between the plate and the weight, means or removably attaching the front ends of flexible leg-strips to the plate, and means for removably attaching a flexible strip over the longitudinal center of the plate.

12. In an artificial lure, the combination of a body comprising a plate, a hook secured to the body, said plate having tongues at its rear end on opposite sides of the hook and means for removably attaching flexible strips to the tongues.

13. In an artificial lure, the combination of a body comprising a plate, a hook secured to the body, said plate having at its rear end on opposite sides of the hook a pair of tongues, and studs on the plate and tongues for removably securing a pair of flexible strips to the plate and over the tongues.

Signed at Cleveland, Ohio, this 23rd day of June, 1926.

WILLIAM A. FOSS.